(12) United States Patent
Hu

(10) Patent No.: US 11,623,435 B2
(45) Date of Patent: Apr. 11, 2023

(54) COMPOSITE FILM USED FOR CABLE WRAPPING LAYER AND PREPARATION METHOD FOR THE SAME

(71) Applicant: HANGZHOU KENENG NEW MATERIAL TECHNOLOGY CO., LTD., Zhejiang (CN)

(72) Inventor: Guangquan Hu, Zhejiang (CN)

(73) Assignee: HANGZHOU KENENG NEW MATERIAL TECHNOLOGY CO., LTD., Hangzhou (CN)

( * ) Notice: Subject to any disclaimer, the term of this patent is extended or adjusted under 35 U.S.C. 154(b) by 146 days.

(21) Appl. No.: 17/129,840

(22) Filed: Dec. 21, 2020

(65) Prior Publication Data

US 2022/0080714 A1 Mar. 17, 2022

(30) Foreign Application Priority Data

Sep. 12, 2020 (CN) .......................... 202010957079.2

(51) Int. Cl.
*B32B 27/36* (2006.01)
*B32B 7/12* (2006.01)
(Continued)

(52) U.S. Cl.
CPC .............. *B32B 27/36* (2013.01); *B32B 7/12* (2013.01); *B32B 15/09* (2013.01); *B32B 15/20* (2013.01);
(Continued)

(58) Field of Classification Search
None
See application file for complete search history.

(56) References Cited

U.S. PATENT DOCUMENTS 5,250,334 A * 10/1993 Lutterotti ................ B32B 27/06
428/458
6,117,541 A * 9/2000 Frisk ....................... B65D 5/708
428/407
(Continued)

FOREIGN PATENT DOCUMENTS

CN     2000-354426 A  * 12/2000
CN       106393877 A  *  2/2017
(Continued)

OTHER PUBLICATIONS

Plastics-determination of Tensile Properties of Films, National Standards of the People's Republic of China, Jul. 3, 1991, GB 13022-91, pp. 100-103.
(Continued)

*Primary Examiner* — Vivian Chen

(57) ABSTRACT

This application provides a composite film for a cable wrapping layer and a preparation method for the same. The composite film for the cable wrapping layer includes a PE film layer, a PET film layer laminated at the PE film layer, an aluminum foil layer laminated at the PET film layer, and a bonding layer arranged between the PET film layer and the aluminum foil layer. The PE film layer is made of raw materials having the following parts by weight: 40-45 parts of LLDPE with a melt index of 0.9-1.1 g/10 min and a density of 0.920-0.922 g/cm$^3$, 35-40 parts of m-LLDPE with a melt index of 1.9-2.1 g/10 min and a density of 0.917-0.920 g/cm$^3$ and 15-25 parts of ethylene-vinyl acetate copolymer.

10 Claims, 2 Drawing Sheets

(51) Int. Cl.
| | |
|---|---|
| *B32B 15/09* | (2006.01) |
| *B32B 15/20* | (2006.01) |
| *B32B 27/08* | (2006.01) |
| *B32B 27/18* | (2006.01) |
| *B32B 27/30* | (2006.01) |
| *B32B 27/32* | (2006.01) |
| *B32B 37/00* | (2006.01) |
| *B32B 37/10* | (2006.01) |
| *B29C 65/78* | (2006.01) |
| *B29C 55/02* | (2006.01) |
| *B29C 55/30* | (2006.01) |
| *C08L 23/08* | (2006.01) |
| *C08L 23/06* | (2006.01) |
| *C08L 23/04* | (2006.01) |
| *B29C 65/00* | (2006.01) |
| *B32B 1/08* | (2006.01) |
| *B29C 55/28* | (2006.01) |
| *B29C 65/20* | (2006.01) |
| *B32B 27/20* | (2006.01) |
| *B32B 37/12* | (2006.01) |
| *B32B 15/082* | (2006.01) |
| *B32B 37/02* | (2006.01) |
| *C08K 9/04* | (2006.01) |
| *C08K 9/06* | (2006.01) |
| *C08J 5/18* | (2006.01) |
| *C08K 3/34* | (2006.01) |
| *H01B 7/18* | (2006.01) |
| *H01B 7/17* | (2006.01) |

(52) U.S. Cl.
CPC .............. *B32B 27/08* (2013.01); *B32B 27/18* (2013.01); *B32B 27/306* (2013.01); *B32B 27/325* (2013.01); *B32B 37/0053* (2013.01); *B32B 37/10* (2013.01); *B29C 55/02* (2013.01); *B29C 55/28* (2013.01); *B29C 55/30* (2013.01); *B29C 65/20* (2013.01); *B29C 65/7858* (2013.01); *B29C 65/7861* (2013.01); *B29C 66/45* (2013.01); *B32B 1/08* (2013.01); *B32B 15/082* (2013.01); *B32B 27/20* (2013.01); *B32B 27/30* (2013.01); *B32B 27/32* (2013.01); *B32B 27/327* (2013.01); *B32B 37/02* (2013.01); *B32B 37/12* (2013.01); *B32B 2250/04* (2013.01); *B32B 2250/24* (2013.01); *B32B 2270/00* (2013.01); *B32B 2307/206* (2013.01); *B32B 2307/212* (2013.01); *B32B 2307/54* (2013.01); *B32B 2307/5825* (2013.01); *B32B 2307/72* (2013.01); *B32B 2307/732* (2013.01); *B32B 2311/24* (2013.01); *B32B 2318/00* (2013.01); *B32B 2323/046* (2013.01); *B32B 2331/04* (2013.01); *B32B 2367/00* (2013.01); *B32B 2457/00* (2013.01); *B32B 2457/04* (2013.01); *B32B 2597/00* (2013.01); *C08J 5/18* (2013.01); *C08J 2323/08* (2013.01); *C08J 2423/08* (2013.01); *C08K 3/346* (2013.01); *C08K 9/04* (2013.01); *C08K 9/06* (2013.01); *C08L 23/04* (2013.01); *C08L 23/06* (2013.01); *C08L 23/0853* (2013.01); *C08L 2203/16* (2013.01); *C08L 2205/025* (2013.01); *C08L 2205/03* (2013.01); *C08L 2207/06* (2013.01); *H01B 7/17* (2013.01); *H01B 7/188* (2013.01); *Y10T 428/31681* (2015.04); *Y10T 428/31699* (2015.04); *Y10T 428/31797* (2015.04); *Y10T 428/31913* (2015.04); *Y10T 428/31928* (2015.04)

(56) References Cited

U.S. PATENT DOCUMENTS

2001/0053821 A1* 12/2001 Robert ............ C09D 123/0815
525/193
2018/0097344 A1* 4/2018 Daga .................. B60R 16/0215

FOREIGN PATENT DOCUMENTS

| | | | |
|---|---|---|---|
| CN | 111471412 A | * | 7/2020 |
| EP | 0945252 A | * | 9/1999 |
| EP | 2216367 A | * | 8/2010 |

OTHER PUBLICATIONS

Determination of Tear Resistance of Plastic Films and Sheets, National Standards of the People's Republic of China, Aug. 4, 2008, GB/T 16578.1-2008.

* cited by examiner

COMPOSITE FILM USED FOR CABLE WRAPPING LAYER AND PREPARATION METHOD FOR THE SAME

CROSS-REFERENCE TO RELATED APPLICATION

The present application claims the priority benefit of China application serial No. 202010957079.2 filed on Sep. 12, 2020. The entirety of the above-mentioned patent application is incorporated herein by reference and made a part of this specification.

TECHNICAL FIELD

This application relates to a field of a composite material, and more particularly, to a composite film for a cable wrapping layer and a preparation method for the same.

BACKGROUND

Cable is a transmission device for electric energy or signal. It is usually a rope-like structure twisted by several or several groups of conductors, in which each group is insulated from each other with one conductor as a center. A highly insulated covering layer fully surrounds an outer surface. As shown in the cross-sectional view of the cable of FIG. 1, the cable includes at least one conductor 1, a refractory layer 2 surrounding the conductor 1, an insulation layer 3 surrounding the refractory layer 2 and a wrapping layer 5 surrounding the insulation layer 3. The wrapping layer 5 surrounds several conductors 1 therein which are surrounded by the refractory layer 2 and the insulation layer 3. There is a filling layer 4 formed by a refractory filler filling between the wrapping layer 5 and the insulation layer 3. A protective sheath layer 6 surrounds the wrapping layer 5.

The material of the insulation layer of the cable is generally PVC, PE, etc. The insulation layer is used for ensuring the electrical property of the cable under normal conditions and protecting the refractory layer. For the purpose of wrapping several conductors into the cable, it is necessary to use materials such as glass tape, PVC tape, non-woven tape or mica tape to surround and fasten the conductors so as to form the wrapping layer. These wrapping materials surround the conductors merely by twisting. During wrapping, it is necessary to take factors such as wrapping pitch, wrapping angle, wrapping tension, etc. into account, which imposes relatively high requirements for wrapping technique. When the wrapping layer is not tight enough, the wrapped conductors are easy to become loose, which is prone to misalignment or relative deviation, thereby leading to poor wrapping effect. Therefore, a new material for the wrapping layer is needed.

BRIEF SUMMARY

In order to improve a wrapping effect of a material of a wrapping layer, the present application provides a composite film for a cable wrapping layer and a preparation method for the same.

In a first aspect, the present application provides a composite film for a cable wrapping layer adopting the following technical solution.

The composite film for the cable wrapping layer of includes a polyethylene (PE) film layer, a polyethylene terephthalate (PET) film layer laminated at the PE film layer, an aluminum foil layer laminated at the PET film layer, and a bonding layer arranged between the PET film layer and the aluminum foil layer. The PE film layer is made of raw materials having the following parts by weight: 40-45 parts of linear low-density polyethylene (LLDPE) with a melt index of 0.9-1.1 g/10 min and a density of 0.920-0.922 g/cm$^3$, 35-40 parts of linear low-density polyethylene produced using metallocene catalysts (m-LLDPE) with a melt index of 1.9-2.1 g/10 min and a density of 0.917-0.920 g/cm$^3$ and 15-25 parts of ethylene-vinyl acetate (EVA) copolymer.

By adopting the above technical solution, the composite film for the cable wrapping layer provided by the present application has well bonding force to the insulation layer of the cable, and excellent tensile strength and tear resistance. When the cable is processed, a raw material of the insulation layer is extruded by an extruder to surround a conductor of the cable, thereby forming an insulation layer outside the conductor. Then the composite film is used to twist the insulation layer (for example, the PE film layer is in contact with the insulation layer), in particular, the bonding force of the composite film with a self-bonding effect to the insulation layer is improved by means of the residual temperature of a surface of the processed insulation layer. The wrapping layer is formed outside the insulation layer of several conductors by the wrapping technique. Since the PE film layer of the composite film provided by the present application has the self-bonding effect, during the process of wrapping, even if the wrapping layer is not tight enough, the wrapped conductors are not easy to become loose, which can reduce a defective percentage of the cable, thereby improving work efficiency.

The compatibility of PE and that of PET are quite different as PE does not contain polar groups while PET does. Adding the ethylene-vinyl acetate copolymer containing polar groups to the raw material of the PE film allows a fairly good heat sealing effect. When the PE film is laminated on the PET film, the self-bonding property of the PE film can improve the bonding strength between the PE film and the PET film, thereby improving the stability of the composite film. The PET film provides the composite film with well tensile strength and tear resistance, while aluminum foil, as a conductive material, has an excellent electromagnetic shielding effect. Hence, the composite film prepared based thereon not only has well bonding property, tensile strength, tear resistance, but also has excellent electromagnetic shielding effect.

Preferably, raw materials of the PE film layer further comprising 3-6 parts by weight of modified montmorillonite which is prepared by crushing montmorillonite, modifying the crushed montmorillonite with a pretreatment agent, and treating the pretreated montmorillonite with hydrogenated rosin glyceride.

By adopting the above technical solution, the oleophobicity rendered by a large number of inorganic ions between each layer of the montmorillonite is not conducive to its dispersion in a polymeric matrix. By the treatment of the pretreatment agent and the hydrogenated rosin glyceride, it changes a high polarity of the surface of the montmorillonite, thereby changing hydrophilic into lipophilic between each layer of the montmorillonite, and reducing its surface energy. It can not only improve the tensile strength and tear resistance of the PE film, but also improve the bonding strength between the PE film and the insulation layer or the bonding strength between the PE film and the PET film, thereby improving the stability of the composite film.

Preferably, the pretreatment agent is composed of sodium lauryl polyoxyethylene ether sulfate, sodium dodecyl sulfate and vinyl tris (β-methoxyethoxy) silane according to a weight ratio of 4-6:2-4:1-3.

By adopting the above technical solution, in this application, the spacing between each layer of the montmorillonite can be increased by the treatment of the pretreatment agent, and a loose structure can be formed during the expansion of the montmorillonite due to the difference in properties of sodium lauryl polyoxyethylene ether sulfate, sodium dodecyl sulfate and vinyl tris (β-methoxyethoxy) silane. In this way, it not only improves the spacing between each layer of the montmorillonite, which is conducive to the get-in of the hydrogenated rosin glyceride, but also facilitates the stripping of the montmorillonite from the PE matrix so as to improve the uniformity of the dispersion of the montmorillonite in the PE matrix.

Preferably, the bonding layer is an EVA film made of raw materials having the following parts by weight: 80-90 parts of the ethylene-vinyl acetate copolymer, 6-8 parts of the m-LLDPE, 3-5 parts of polyvinyl butyral, 2-3 parts of modified montmorillonite, 0.3-0.5 parts of an antioxidant and 1-2 parts of a lubricant;

the melt index of the m-LLDPE is 1.9-2.1 g/10 min and the density thereof is 0.917-0.920 g/cm$^3$; and the modified montmorillonite is prepared by crushing montmorillonite, modifying the crushed montmorillonite with a pretreatment agent, then treating the pretreated montmorillonite with hydrogenated rosin glyceride.

By adopting the above technical solution, the EVA film provided by the present application has well bonding force to PET and aluminum foil. The improvement of the tensile strength of the EVA film allows adaptability to the mechanical properties of the PET film and aluminum foil, thereby preventing the EVA film from layering so as to improve the stability of the composite film.

Preferably, a thickness ratio of the PE film layer, the PET film layer and the aluminum foil layer is in a range of 2-4:3-5:2-4.

By adopting the above technical solution, the composite film prepared based thereon has both excellent mechanical properties and bonding properties.

In a second aspect, this application provides a preparation method for a composite film of a cable wrapping layer, which adopts the following technical solution.

The preparation method for the composite film of the cable wrapping layer includes the following steps:

(S1) placing a PE film on a first unreeling roller of a laminator at a temperature of 70-80° C. and a tension of 30-40 N, placing a PET film on a second unreeling roller of the laminator at a temperature of 80-90° C. and a tension of 40-45 N, applying the PE film to the PET film at a laminating speed of 80-100 m/min, and laminating the two films with a pressing roller at a pressure of 0.2-0.4 Mpa; and reeling with a laminating roller at a temperature of 40-50° C., a pressure of 0.2-0.4 Mpa and a reeling tension of 30-40 N to obtain an original composite film; and (S2) placing the original composite film on a third unreeling roller of the laminator at a temperature of 70-80° C. and a tension of 30-40 N, placing an EVA film on a fourth unreeling roller of the laminator at a temperature of 60-70° C. and a tension of 10-20 N; applying the EVA film to one side of the PET film of the original composite film at a laminating speed of 80-100 m/min, and laminating the two with the pressing roller at a pressure of 0.2-0.4 Mpa; and applying a preheated aluminum foil to the original composite film so that the preheated aluminum foil is in contact with the EVA film, and laminating by hot pressing for 30-40 seconds at a temperature of 120-130° C. and a pressure of 3-5 Mpa to obtain a composite film.

By adopting the above technical solution, the PE film and the PET film are laminated by the laminator under a certain temperature and pressure to obtain the original composite film, and then the composite film and the aluminum foil are bonded through the EVA film to obtain the composite film. The composite film has stable property and a good winding effect on the insulation material of the cable.

Preferably, the PE film is prepared according to the following method: mixing LLDPE, m-LLDPE and ethylene-vinyl acetate copolymer at a high speed to obtain a mixture; and after placing the mixture in a film blowing machine, melting the mixture, then extruding and blowing the melted mixture at a temperature of 160-190° C. to obtain the PE film.

Preferably, raw materials of the PE film further include 3-6 parts by weight of modified montmorillonite which is prepared by the following method:

(S3) grinding and sieving montmorillonite to obtain a montmorillonite powder; and adding 0.05-0.2 parts by weight of a dispersant and 100 parts by weight of water to 10 parts by weight of the montmorillonite powder and stiffing thoroughly to obtain a montmorillonite suspension;

(S4) adding 0.2-0.4 parts by weight of a pretreatment agent to the montmorillonite suspension, stiffing at a speed of 2000-3000 r/min for 10-20 min, drying at a temperature of 80-100° C. for 36-48 h, and crushing and sieving it to obtain a pretreated montmorillonite; and (S5) adding 2-4 parts by weight of 10 wt % acetone solution of hydrogenated rosin glyceride to the pretreated montmorillonite, stiffing at a speed of 200-400 r/min at a temperature of 30-40° C. for 1 h, standing for 3-5 h, raising the temperature to 85-90° C., and removing an acetone solvent in the 10 wt % acetone solution to obtain a solidified substance; and crushing and sieving the solidified substance to obtain the modified montmorillonite.

By adopting the above technical solution, in this application, the montmorillonite is crushed to be fine, which is conducive to the improvement of the efficiency of subsequent processes. Since fine montmorillonite is prone to agglomeration, the addition of the dispersant makes it have good dispersibility in water, which is beneficial to improve the stability of the system. Under the action of the pretreatment agent, the volume of the montmorillonite can be increased, so that the spacing between crystal layers is increased, which is conducive to the get-in of the hydrogenated rosin glyceride and the stripping of the montmorillonite layer. The addition of the acetone solution of the hydrogenated rosin glyceride allows the hydrogenated rosin glyceride to get in the gap between layers of the montmorillonite and surround its surface, thereby obtaining the modified montmorillonite. The modified montmorillonite added to the raw materials of the PE film is stripped off in the PE matrix under the action of friction and shear and uniformly dispersed in the matrix. On the one hand, it can improve the tensile strength and tear resistance of the PE film. On the other hand, the modified montmorillonite can act as a tackifying and bridging agent to improve the bonding strength between the PE film and the insulating layer or the bonding strength between the PE film and the PET film, thereby improving the stability of the composite film.

Preferably, the dispersant includes one selected from a group consisting of sodium hexametaphosphate and sodium polycarboxylate.

By adopting the above technical solution, the sodium hexametaphosphate and sodium polycarboxylate can improve the suspension and dispersion of the montmorillonite in water, which is conducive to the subsequent process.

Preferably, the EVA film is prepared by the following method: premixing 80-90 parts by weight of ethylene-vinyl acetate copolymer, 6-8 parts by weight of m-LLDPE, 3-5 parts by weight of polyvinyl butyral, 2-3 parts by weight of modified montmorillonite, 0.3-0.5 parts by weight of an antioxidant and 1-2 parts by weight of a lubricant to obtain a premix; and melting and extruding the premix at a temperature of 140-180° C. to obtain a melt, and casting the melt into a film to obtain the EVA film.

By adopting the above technical solution, the raw material of the EVA film is melted, extruded and cast into the film, which is simple and easy to operate. In addition, in the process of laminating the PET film and the aluminum foil, compared with soluble glue, the use of the EVA film is more convenient, and it is helpful to improve the flatness of the laminated PET film and aluminum foil, thereby improving the appearance of the composite film.

In summary, this application has the following beneficial effects.

(1) In this application, as the PE film with the self-bonding property is laminated at the PET film and the aluminum foil film, the composite film prepared therefrom not only has good bonding property, tensile strength, and tear resistance, but also has excellent electromagnetic shielding effect. Hence, when conductors of the cable are wrapped, the wrapped conductors are not easy to become loose, allowing a good wrapping effect.

(2) The modified montmorillonite is further added to the raw materials of the PE film in this application. The addition of modified montmorillonite can not only improve the mechanical properties such as the tensile strength and tear resistance of the PE film, but also improve its bonding force to the PET film, aluminum foil and PVC insulation layer, thereby improving the wrapping and winding effect of the composite film.

(3) The EVA film provided by the present invention is used to bond the PET film with the aluminum foil, thereby preventing the composite film from layering so as to improve the stability of the composite film.

DETAILED DESCRIPTION

Figure 1:
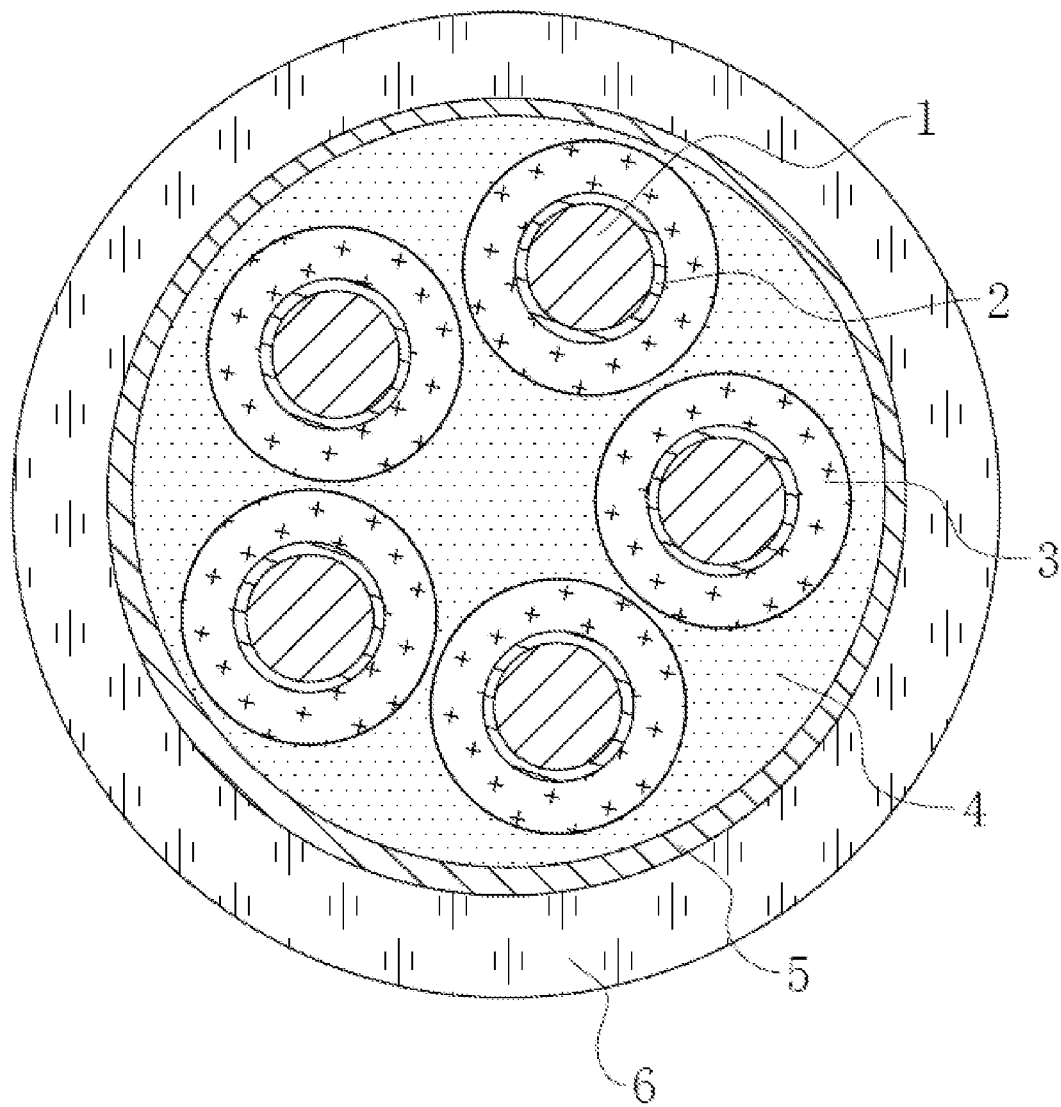
FIG. 1 is a cross-sectional view of a known cable.

This application will be described in detail below in combination with the drawings and examples.

Preparation Example of Modified Montmorillonite

A pretreatment agent in the following Preparation Examples was composed of sodium lauryl polyoxyethylene ether sulfate, sodium lauryl sulfate and vinyl tris (β-methoxyethoxy) silane according to a weight ratio of 5:3:2; the CAS number of the sodium lauryl polyoxyethylene ether sulfate was 9004-82-4, which was selected from the fatty alcohol polyoxyethylene ether sodium sulfate AES with the model of C24E2S provided by Nantong Reform Petro-chemical Co., Ltd.; the sodium lauryl sulfate was selected from K12 sodium lauryl sulfate provided by Shanghai White Cat Co., Ltd.; the vinyl tris (β-methoxyethoxy) silane was selected from A-172 silane coupling agent provided by Hangzhou Sait Polymer Technology Co., Ltd.; the sodium polycarboxylate dispersant was selected from the BG554 sodium polycarboxylate dispersant provided by Dongguan Bogao Chemical Industry; and the hydrogenated rosin glyceride was selected from the hydrogenated rosin glyceride provided by Wuhan Kabuda Chemical Co., Ltd.

Preparation Example 1 of modified montmorillonite 1. grinding montmorillonite and sieving it through a 200 mesh sieve to obtain a montmorillonite powder; and adding 0.05 kg sodium hexametaphosphate and 100 kg water to 10 kg montmorillonite powder and stiffing thoroughly at a speed of 1000 r/min for 20 min to obtain a montmorillonite suspension;

2. adding 0.2 kg pretreatment agent (composed of 0.1 kg sodium lauryl polyoxyethylene ether sulfate, 0.06 kg sodium lauryl sulfate and 0.04 vinyl tris (β-methoxyethoxy) silane) to the montmorillonite suspension, stiffing at a speed of 2000 r/min for 10 min, drying at a temperature 80° C. for 36 h, and conducting crushing and sieving through the 200 mesh sieve to obtain a pretreated montmorillonite; and 3. adding 2 kg, 10 wt % acetone solution of hydrogenated rosin glyceride to the pretreated montmorillonite, stiffing at a speed of 200 r/min at a temperature of 30° C. for 1 h, keeping the temperature and standing for 3 h, raising the temperature to 85° C., and removing the acetone solvent in the 10 wt % acetone solution by distillation to obtain a solidified substance; crushing and sieving the solidified substance through the 200 mesh sieve to obtain a modified montmorillonite.

Preparation Example 2 of modified montmorillonite: this example was different from the Preparation Example 1 of the modified montmorillonite in that in step 1, the sodium hexametaphosphate was 0.1 kg;
in step 2, the pretreatment agent was 0.3 kg, the stiffing speed was 2500 r/min, the stiffing time was 15 min, the drying temperature was 90° C., and the drying time was 42 h; and
in step 3, the acetone solution of the hydrogenated rosin glyceride was 3 kg, the stiffing temperature was 35° C., the stiffing speed was 300 r/min, the temperature keeping time was 4 h, and the temperature was raised to 87° C.

Preparation Example 3 of modified montmorillonite: this example was different from the Preparation Example 1 of the modified montmorillonite in that in step 1, the sodium hexametaphosphate was 0.2 kg;
in step 2, the pretreatment agent was 0.4 kg, the stiffing speed was 3000 r/min, the stiffing time was 20 min, the drying temperature was 100° C., and the drying time was 48 h; and
in step 3, the acetone solution of the hydrogenated rosin glyceride was 4 kg, the stiffing temperature was 40° C., the stirring speed was 400 r/min, the temperature keeping time was 5 h, and the temperature was raised to 90° C.

Preparation Example of Polyethylene (PE) Film

The linear low-density polyethylene (LLDPE) in the following Preparation Examples was selected from the MJA-042 LLDPE with a melt index of 1 g/min and a density of 0.921 g/cm$^3$ provided by ExxonMobil corporation, US; linear low-density polyethylene produced using metallocene catalysts (m-LLDPE) was selected from 2018 MB m-LL-DPE with a melt index of 2 g/min and a density of 0.918 g/cm$^3$ provided by ExxonMobil corporation, US; and the ethylene-vinyl acetate (EVA) copolymer was selected from the VA930 ethylene-vinyl acetate copolymer with a density of 0.95 g/cm³ and a VA content of 28% provided by Lotte, Korea.

Preparation Example 1 of PE film: mixing 40 kg LLDPE, 35 kg m-LLDPE and 25 kg ethylene-vinyl acetate copolymer at a high speed of 1000 r/min for 15 min to obtain a mixture; and placing the mixture in a film blowing machine in which a temperature of a first zone of the film blowing machine was 160° C., a temperature of a second zone was 170° C., a temperature of a third zone was 180° C., a temperature of a fourth zone was 190° C., a temperature of a fifth zone was 180° C., and a temperature of a die head was 180° C., melting, extruding, drawing a film at a speed of 30 r/min, and slitting and reeling the film to obtain the PE film with a thickness of 10 μm.

Preparation Example 2 of PE film: this example was different from the Preparation Example 1 of PE film in that raw materials were composed of: 42.5 kg LLDPE, 35 kg m-LLDPE, and 25 kg ethylene-vinyl acetate copolymer.

Preparation Example 3 of PE film: this example was different from the Preparation Example 1 of PE film in that raw materials were composed of: 45 kg LLDPE, 40 kg m-LLDPE, and 15 kg ethylene-vinyl acetate copolymer.

Preparation Example 4 of PE film: this example was different from the Preparation Example 1 of PE film in that 3 kg modified montmorillonite prepared by modified montmorillonite of Preparation Example 1 was added to the mixture.

Preparation Example 5 of PE film: this example was different from the Preparation Example 1 of PE film in that 4.5 kg modified montmorillonite prepared by modified montmorillonite of Preparation Example 2 was added to the mixture.

Preparation Example 6 of PE film: this example was different from the Preparation Example 1 of PE film in that 6 kg modified montmorillonite prepared by modified montmorillonite of Preparation Example 3 was added to the mixture.

Preparation Example 7 of PE film: this example was different from the Preparation Example 1 of PE film in that raw materials were free of the ethylene-vinyl acetate copolymer.

Preparation Example of EVA Film

The ethylene-vinyl acetate copolymer in the following Preparation Examples was selected from the EVA42-60 ethylene-vinyl acetate copolymer with a VA content of 42% provided by Arkema, US; m-LLDPE was selected from 2018 MB m-LLDPE with a melt index of 2 g/10 min and a density of 0.918 g/cm³ provided by ExxonMobil Corporation, US, and the modified montmorillonite was selected from the modified montmorillonite prepared by Preparation Example 1.

Preparation Example 1 of EVA film: mixing 80 kg ethylene-vinyl acetate copolymer, 6 kg m-LLDPE, 3 kg polyvinyl butyral, 2 kg modified montmorillonite, 0.5 kg antioxidant 1010, and 1 kg polyethylene wax for 10 min at a speed of 1000 r/min to obtain a premix; placing the premix in a twin-screw extruder in which a temperature of a first zone of the twin-screw extruder is 140° C., a temperature of a second zone is 150° C., a temperature of a third zone is 170° C., a temperature of a fourth zone is 180° C., a temperature of a fifth zone is 180° C., a temperature of a die head is 170° C., and a speed of a screw is 50 r/min, melting, extruding to obtain a melt, casting the melt at a temperature of 180° C. through a casting machine to form a film, and reeling the film and cooling down to obtain the EVA film with a thickness of 3 μm.

Preparation Example 2 of EVA film: this example was different from the Preparation Example 1 of EVA film in that raw materials were composed of: 85 kg ethylene-vinyl acetate copolymer, 7 kg m-LLDPE, 4 kg polyvinyl butyral, 2.5 kg modified montmorillonite, 0.4 kg antioxidant 1010, and 1.5 kg polyethylene wax.

Preparation Example 3 of EVA film: this example was different from the Preparation Example 1 of EVA film in that raw materials were composed of: 90 kg ethylene-vinyl acetate copolymer, 8 kg m-LLDPE, 5 kg polyvinyl butyral, 3 kg modified montmorillonite, 0.5 kg antioxidant 1010, and 2 kg polyethylene wax.

Preparation Example 4 of EVA film: this example was different from the Preparation Example 1 of EVA film in that raw materials were free of modified montmorillonite.

Preparation Example 5 of EVA film: this example was different from the Preparation Example 1 of EVA film in that raw materials were free of m-LLDPE and polyvinyl butyral.

EXAMPLES

Example 1

Figure 2:
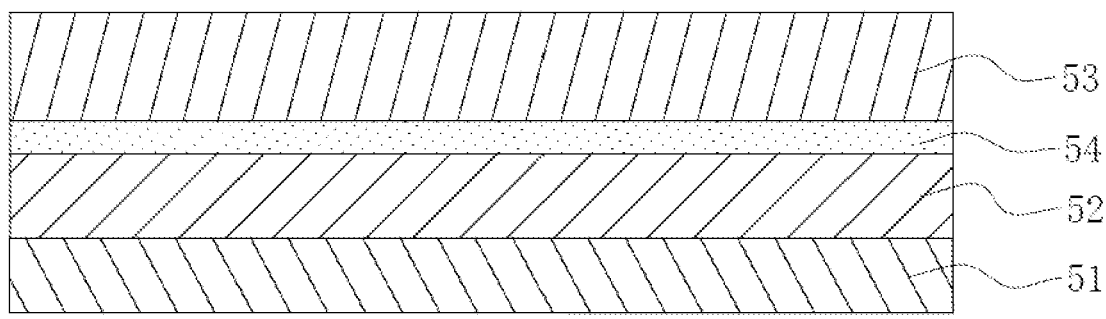
FIG. 2 is a cross-sectional view of a layer structure of a wrapping layer according to an example of the present application.

Referring to FIG. 2, a composite film for a cable wrapping layer includes a PE film layer 51, a polyethylene terephthalate (PET) film layer 52 laminated on the PE film layer 51, an aluminum foil layer 53 laminated on the PET film layer 52, and a bonding layer 54 arranged between the PET film layer 52 and the aluminum foil layer 53. During use, the PE film layer 51 contacts with an insulation layer of the cable.

A preparation method for the composite film of the cable wrapping layer included the following steps:

S1, placing a PE film prepared in the Preparation Example 1 of PE film on a first unreeling roller of a laminator at a temperature of 70° C. and a tension of 30 N, placing a PET film on a second unreeling roller of the laminator at a temperature of 80° C. and a tension of 40 N, applying the PE film to the PET film at a laminating speed of 80 m/min, and laminating the two by a pressing roller at a pressure of 0.2 Mpa; and reeling by a laminating roller at a temperature of 40° C., a pressure of 0.2 Mpa and a reeling tension of 30 N to obtain an original composite film; and S2, placing the original composite film on a third unreeling roller of the laminator at a temperature of 70° C. and a tension of 30 N, placing an EVA film (prepared in the Preparation Example 1 of EVA film) on a fourth unreeling roller of the laminator at a temperature of 60° C. and a tension of 10 N; applying the EVA film to one side of the PET film of the original composite film at a laminating speed of 80 m/min, and laminating the two films with the pressing roller at a pressure of 0.2 Mpa; and applying a preheated aluminum foil to the original composite film so that the aluminum foil is in contact with the EVA film, and laminating the original composite film and the aluminum foil by hot pressing for 30 s at a temperature of 120° C. and a pressure of 3 Mpa to obtain a composite film with a thickness ratio of the PE film layer, the PET film layer and the aluminum foil layer being 3:4:3.

Example 2 was different from Example 1 in that the composite film of the cable wrapping layer was prepared according to the following method: in S1, the PE film was selected from the Preparation Example 2 of PE film, the temperature of the first unreeling roller was 75° C. and the tension thereof was 35 N; the temperature of the second unreeling roller was 85° C. and the tension thereof was 42 N; the laminating speed was 90 m/min; and the pressure of the pressing roller was 0.3 Mpa; and the temperature of the laminating roller was 45° C., the pressure was 0.3 Mpa, and the unreeling tension was 35 N; and in S2, the temperature of the third unreeling roller was 75° C. and the tension thereof was 35 N; the EVA film was selected from Preparation Example 2 of EVA film; the temperature of the fourth unreeling roller was 65° C. and the tension thereof was 15 N; the laminating speed was 90 m/min; the pressure of the pressing roller was 0.3 Mpa; and the laminating temperature of the hot pressing was 45° C., the pressure was 4 Mpa, and the time was 35 s.

Example 3 was different from Example 1 in that the composite film of the cable wrapping layer was prepared according to the following method: in S1, the PE film was selected from Preparation Example 3 of PE film, the temperature of the first unreeling roller was 80° C. and the tension thereof was 40 N; the temperature of the second unreeling roller was 90° C. and the tension thereof was 45 N; the laminating speed was 100 m/min; the pressure of the pressing roller was 0.4 Mpa; and the temperature of the laminating roller was 50° C., the pressure was 0.4 Mpa, and the unreeling tension was 40 N; and In S2, the temperature of the third unreeling roller was 80° C. and the tension thereof was 40 N; the EVA film was selected from Preparation Example 3 of EVA film; the temperature of the fourth unreeling roller was 70° C. and the tension thereof was 20 N; the laminating speed was 100 m/min; the pressure of the pressing roller was 0.4 Mpa; and the laminating temperature of the hot pressing was 130° C., the pressure was 5 Mpa, and the time was 40 s.

Example 4 was different from Example 1 in that the PE film was selected from the Preparation Example 4 of PE film.

Example 5 was different from Example 1 in that the PE film was selected from the Preparation Example 5 of PE film.

Example 6 was different from Example 1 in that the PE film was selected from the Preparation Example 6 of PE film.

Comparison Example

Comparison Example 1: this example was different from Example 1 in that the PE film was selected from the Preparation Example 7 of PE film and the raw materials for preparing the PE film were free of the ethylene vinyl acetate copolymer.

Comparison Example 2: this example was different from Example 1 in that the EVA film was selected from the Preparation Example 4 of EVA film.

Comparison Example 3: this example was different from Example 1 in that the EVA film was selected from the Preparation Example 5 of EVA film.

Performance Test

The performances of the composite film prepared in Examples 1-6 and comparison Examples 1-3 were tested according to the following methods, and the results were shown in Table 1.

Tensile strength and elongation at break: test according to GB/T13022-1991 "plastics-determination of tensile properties of films".

Tear strength: test according to GB/T16578.1-2008 "plastics-film and sheeting-determination of tear resistance-part 1: trouser tear method".

Strip strength: In order to verify the bonding force between each layer of the composite film, a composite film sample with a size of 100×50 mm was cut and was placed in an area at a temperature of (23±2°) C. with a relative humidity of (50±5)% for 40 h. The PE film and the PET film, and the PET film and the aluminum foil were respectively striped by 30 mm in advance. The sample was placed in a tensile testing machine for peeing at a striping speed of 100 mm/min. The strip strength between the PE film and the PET film and the strip strength between the PET film and the aluminum foil were tested, respectively.

Since the material of the wrapping layer is used to wrap the conductors by twisting, the PE film of the composite film not only contacts with the insulation layer of the cable, but also overlaps with the aluminum foil during the twisting. Therefore, it is necessary to test the strip strength between the PE film and the insulation layer (PVC material) and the strip strength between the PE film and the aluminum foil.

The strip strength between PE film and PVC was tested by the following method. The composite film sample with the size of 120×50 mm and a PVC board with a size of 100×50×10 mm were placed in an area at a temperature of (23±2°) C. with a relative humidity of (50±5)% for 40 h. After the PVC board was heated to 60° C., one side of the PE film of the composite film sample was immediately attached to the PVC board so that the composite film and the PVC board were completely overlapped in the width direction. A static pressure of 830 Pa was applied on the overlapping part of the composite film and PVC board for 30 minutes to obtain a composite film/PVC sample. The sample was placed in the tensile testing machine for striping at a striping speed of 100 mm/min to test the strip strength between the composite film and PVC.

The strip strength between the PE film and aluminum foil was tested by the following method. The composite film sample with a size of 100×50 mm was cut and placed in an area at a temperature of (23±2°) C. with a relative humidity of (50±5)% for 40 h. Two composite film samples were overlapped so that they were completely overlapped in the width direction, and the PE film layer of one composite film overlapped on the aluminum foil layer of the other composite film. The length of the overlapping part in the length direction was 30 mm, and the total length of the overlapped sample was 170 mm A static pressure of 830 Pa was applied on the overlapping part for 30 minutes to obtain an overlapped composite film/composite film sample. The sample was placed in the tensile testing machine for striping at a striping speed of 100 mm/min to test the strip strength between the PE film and the aluminum foil.

TABLE 1 property test table of composite film prepared in Examples 1-6 and comparison Examples 1-3

| Items | | Example 1 | Example 2 | Example 3 | Example 4 | Example 5 | Example 6 | Comparison Example 1 | Comparison Example 2 | Comparison Example 3 |
|---|---|---|---|---|---|---|---|---|---|---|
| Tensile strength, Mpa | Longitudinal direction | 132.1 | 131.7 | 132.0 | 143.5 | 142.1 | 143.0 | 110.3 | 132.1 | 132.1 |
| | Transverse direction | 134.9 | 132.4 | 133.3 | 145.2 | 143.6 | 143.9 | 115.3 | 134.9 | 134.9 |

TABLE 1-continued property test table of composite film prepared in Examples 1-6 and comparison Examples 1-3

| | Items | Example 1 | Example 2 | Example 3 | Example 4 | Example 5 | Example 6 | Comparison Example 1 | Comparison Example 2 | Comparison Example 3 |
|---|---|---|---|---|---|---|---|---|---|---|
| Elongation at break, % | Longitudinal direction | 143.2 | 140.9 | 141.6 | 171.1 | 170.1 | 170.5 | 121.1 | 143.2 | 143.2 |
| | Transverse direction | 163.2 | 161.1 | 164.7 | 182.2 | 182.0 | 182.1 | 143.2 | 163.2 | 163.2 |
| Tear resistance, N/mm | Longitudinal direction | 165.2 | 164.6 | 165.8 | 173.9 | 174.0 | 174.3 | 152.1 | 165.2 | 165.2 |
| | Transverse direction | 172.3 | 172.0 | 172.1 | 181.7 | 181.5 | 181.8 | 160.4 | 172.3 | 172.3 |
| Peel strength, N/cm | PE film/ PET film | 6.8 | 6.8 | 6.7 | 8.9 | 8.7 | 8.8 | 1.9 | 6.8 | 6.8 |
| | PET film/ aluminum foil | 9.3 | 9.1 | 9.3 | 9.3 | 9.3 | 9.3 | 9.3 | 8.8 | 8.4 |
| | PE film/ PVC board | 5.0 | 5.2 | 5.0 | 8.1 | 8.0 | 80 | 1.8 | 5.0 | 5.0 |
| | PE film/ aluminum foil | 5.4 | 5.5 | 5.4 | 8.5 | 8.4 | 8.4 | 2.2 | 5.4 | 5.4 |

Combining Example 1 and Comparison Example 1 with Table 1, it can be seen that the tensile strength and tear strength of the composite film and the strip strength of PE film/PET film, PE film/PVC board, and PE film/aluminum foil in Example 1 were significantly better than the tensile strength, tear strength and peel strength of the composite film in Comparison Example 1, showing that the adding of the ethylene-vinyl acetate copolymer in the PE film can significantly increase the self-bonding of the PE film, thereby improving the bonding strength between the PE film and the PET film and the bonding strength between the PVC and the aluminum foil.

Combining Example 1 and Example 4 with Table 1, it can be seen that the tensile strength and tear strength of the composite film and the strip strength of PE film/PET film, PE film/PVC board, and PE film/aluminum foil in Example 4 were significantly better than the tensile strength, tear strength and strip strength of the composite film in Comparison Example 1, showing that the adding of the modified montmorillonite in the PE film can significantly increase the self-bonding of the PE film, thereby improving the bonding strength between the PE film and the PET film and the bonding strength between the PVC and the aluminum foil.

Combining Example 1, Comparison Example 2 and Comparison Example 3 with Table 1, it can be seen that the strip strength of PET film/aluminum foil in Comparison Example 2 and Comparison Example 3 were significantly lower than the strip strength of PET film/aluminum foil in Example 1, showing that the adding of the modified montmorillonite, m-LLDPE and polyvinyl butyral in the EVA film can significantly increase the bonding strength between the EVA film and the aluminum foil and the bonding strength between the EVA film and the PET film.

What is claimed is:

1. A composite film for a cable wrapping layer comprising a polyethylene (PE) film layer, a polyethylene terephthalate (PET) film layer laminated on the PE film layer, an aluminum foil layer laminated on the PET film layer, and a bonding layer arranged between the PET film layer and the aluminum foil layer; in which the PE film layer is made of raw materials having the following parts by weight: 40-45 parts of linear low-density polyethylene (LLDPE) with a melt index of 0.9-1.1 g/10 min and a density of 0.920-0.922 g/cm$^3$, 35-40 parts of linear low-density polyethylene produced using metallocene catalysts (m-LLDPE) with a melt index of 1.9-2.1 g/10 min and a density of 0.917-0.920 g/cm$^3$ and 15-25 parts of ethylene-vinyl acetate (EVA) copolymer.

2. The composite film for the cable wrapping layer according to claim 1, raw materials of the PE film layer further comprising 3-6 parts by weight of modified montmorillonite which is prepared by crushing montmorillonite, modifying the crushed montmorillonite with a pretreatment agent, and treating the pretreated montmorillonite with hydrogenated rosin glyceride.

3. The composite film for the cable wrapping layer according to claim 2, wherein the pretreatment agent is composed of sodium lauryl polyoxyethylene ether sulfate, sodium dodecyl sulfate and vinyl tris (β-methoxyethoxy) silane in a weight ratio of 4-6:2-4:1-3.

4. The composite film for the cable wrapping layer according to claim 1, wherein the bonding layer is an EVA film made of raw materials having the following parts by weight: 80-90 parts of the ethylene-vinyl acetate copolymer, 6-8 parts of the m-LLDPE, 3-5 parts of polyvinyl butyral, 2-3 parts of modified montmorillonite, 0.3-0.5 parts of an antioxidant and 1-2 parts of a lubricant;

the melt index of the m-LLDPE is 1.9-2.1 g/10 min and the density thereof is 0.917-0.920 g/cm$^3$; and the modified montmorillonite is prepared by crushing montmorillonite, modifying the crushed montmorillonite with a pretreatment agent, then treating the pretreated montmorillonite with hydrogenated rosin glyceride.

5. The composite film for the cable wrapping layer according to claim 1, wherein a thickness ratio of the PE film layer, the PET film layer and the aluminum foil layer is in a range of 2-4:3-5:2-4.

6. A preparation method for the composite film for the cable wrapping layer according to claim 1 comprising the following steps:

(S1) placing a PE film on a first unreeling roller of a laminator at a temperature of 70-80° C. and a tension of 30-40 N, placing a PET film on a second unreeling roller of the laminator at a temperature of 80-90° C. and a tension of 40-45 N, applying the PE film to the PET film at a laminating speed of 80-100 m/min, and laminating the two films with a pressing roller at a pressure of 0.2-0.4 Mpa; and reeling with a laminating roller at a temperature of 40-50° C., a pressure of 0.2-0.4 Mpa and a reeling tension of 30-40 N to obtain an original composite film; and (S2) placing the original composite film on a third unreeling roller of the laminator at a temperature of 70-80° C. and a tension of 30-40 N, placing an EVA film on a fourth unreeling roller of the laminator at a temperature of 60-70° C. and a tension of 10-20 N; applying the EVA film to one side of the PET film of the original composite film at a laminating speed of 80-100 m/min, and laminating the two films with the pressing roller at a pressure of 0.2-0.4 Mpa; and applying a preheated aluminum foil to the original composite film so that the preheated aluminum foil is in contact with the EVA film, and laminating by hot pressing for 30-40 seconds at a temperature of 120-130° C. and a pressure of 3-5 Mpa to obtain a composite film.

7. The preparation method for the composite film for the cable wrapping layer according to claim 6, wherein the PE film is prepared according to the following method: mixing LLDPE, m-LLDPE and ethylene-vinyl acetate copolymer to obtain a mixture; and after placing the mixture in a film blowing machine, melting the mixture, then extruding and blowing the melted mixture at a temperature of 160-190° C. to obtain the PE film.

8. The preparation method for the composite film for the cable wrapping layer according to claim 6, wherein raw materials of the PE film further comprises 3-6 parts by weight of modified montmorillonite which is prepared by the following method:

(S3) grinding and sieving montmorillonite to obtain a montmorillonite powder; and adding 0.05-0.2 parts by weight of a dispersant and 100 parts by weight of water to 10 parts by weight of the montmorillonite powder and stirring thoroughly to obtain a montmorillonite suspension;

(S4) adding 0.2-0.4 parts by weight of a pretreatment agent to the montmorillonite suspension, stirring at a speed of 2000-3000 r/min for 10-20_min, drying at a temperature of 80-100° C. for 36-48 h, and crushing and sieving to obtain a pretreated montmorillonite; and (S5) adding 2-4 parts by weight of 10 wt % acetone solution of hydrogenated rosin glyceride to the pretreated montmorillonite, stirring at a speed of 200-400 r/min at a temperature of 30-40° C. for 1 h, standing for 3-5 h, raising the temperature to 85-90° C., and removing an acetone solvent in the 10 wt % acetone solution to obtain a solidified substance; and crushing and sieving the solidified substance to obtain the modified montmorillonite.

9. The preparation method for the composite film for the cable wrapping layer according to claim 8, wherein the dispersant comprises one selected from a group consisting of sodium hexametaphosphate and sodium polycarboxylate.

10. The preparation method for the composite film for the cable wrapping layer according to claim 6, wherein the EVA film is prepared by the following method: premixing 80-90 parts by weight of ethylene-vinyl acetate copolymer, 6-8 parts by weight of m-LLDPE, 3-5 parts by weight of polyvinyl butyral, 2-3 parts by weight of modified montmorillonite, 0.3-0.5 parts by weight of an antioxidant and 1-2 parts by weight of a lubricant to obtain a premix; and melting and extruding the premix at a temperature of 140-180° C. to obtain a melt, and casting the melt into a film to obtain the EVA film.

* * * * *